United States Patent
Kormelink et al.

(10) Patent No.: US 9,107,435 B2
(45) Date of Patent: Aug. 18, 2015

(54) RECONSTITUTED CEREAL GRAIN

(71) Applicant: Mars, Incorporated, McLean, VA (US)

(72) Inventors: Felix Kormelink, Oud Beijerland (NL); Kristien Pauwels, Olen (BE); Raymond Van Bussell, Veghel (NL); Luc L. I. Jacops, Olen (BE)

(73) Assignee: Mars, Inc., McLean, VA (US)

( * ) Notice: Subject to any disclaimer, the term of this patent is extended or adjusted under 35 U.S.C. 154(b) by 0 days.

(21) Appl. No.: 14/358,299

(22) PCT Filed: Nov. 16, 2012

(86) PCT No.: PCT/IB2012/056498
§ 371 (c)(1),
(2) Date: May 15, 2014

(87) PCT Pub. No.: WO2013/072888
PCT Pub. Date: May 23, 2013

(65) Prior Publication Data
US 2014/0302221 A1    Oct. 9, 2014

(30) Foreign Application Priority Data
Nov. 16, 2011 (GB) .................................. 1119770.4

(51) Int. Cl.
| | | |
|---|---|---|
| A23L 1/182 | (2006.01) | |
| A23L 1/00 | (2006.01) | |
| A23L 1/0522 | (2006.01) | |
| A23L 1/164 | (2006.01) | |
| A23L 1/168 | (2006.01) | |
| A23L 1/308 | (2006.01) | |

(52) U.S. Cl.
CPC ............... *A23L 1/182* (2013.01); *A23L 1/0014* (2013.01); *A23L 1/0522* (2013.01); *A23L 1/164* (2013.01); *A23L 1/168* (2013.01); *A23L 1/308* (2013.01)

(58) Field of Classification Search
CPC ......... A23L 1/168; A23L 1/182; A23L 1/308; A23L 1/164; A23L 1/0067
See application file for complete search history.

(56) References Cited

U.S. PATENT DOCUMENTS

| | | | |
|---|---|---|---|
| 5,609,896 A * | 3/1997 | Cox et al. ........................ | 426/72 |
| 5,932,271 A | 8/1999 | Koide | |
| 8,128,977 B2 * | 3/2012 | Anfinsen et al. ............... | 426/557 |
| 2004/0109931 A1 | 6/2004 | Wu et al. | |
| 2009/0047410 A1 * | 2/2009 | Lin ............................... | 426/618 |
| 2009/0148562 A1 | 6/2009 | Lin | |
| 2011/0206826 A1 * | 8/2011 | Steiger ........................... | 426/618 |
| 2014/0302225 A1 * | 10/2014 | Kormelink et al. ........... | 426/654 |

FOREIGN PATENT DOCUMENTS

| | | |
|---|---|---|
| EP | 0277498 A2 | 8/1988 |
| KR | 20060120335 * | 11/2006 |
| WO | 2005053433 A1 | 6/2005 |
| WO | 2006138705 A1 | 12/2006 |
| WO | 2010020640 A1 | 2/2010 |
| WO | 2010102521 A1 | 9/2010 |

OTHER PUBLICATIONS

Derwent Abstract for KR 20060120335 published Nov. 2006.*
English Machine Translation for KR 20060120335 published Nov. 2006.*

* cited by examiner

*Primary Examiner* — Anthony Weier
(74) *Attorney, Agent, or Firm* — Norton Rose Fulbright US LLP

(57) ABSTRACT

A reconstituted cereal grain in which the grain has at least about 10 wt % of resistant starch dietary fibre, at least about 25 wt % of cereal starch in addition to the resistance dietary fibre and at least about 0.5 wt % emulsifier based on the dry weight of the grain. The grain has a product density of greater than about 1 kg/l. The grains have a natural appearance and cooking properties similar to parboiled milled cereal grains.

16 Claims, No Drawings

RECONSTITUTED CEREAL GRAIN

CROSS-REFERENCE TO RELATED APPLICATIONS

This application is a national stage filing of PCT/IB2012/056498 filed Nov. 16, 2012 claiming priority to GB 1119770.4 filed Nov. 16, 2011.

TECHNICAL FIELD

The present invention relates to high-fibre granular extruded products, in particular high-fibre rice products, and to methods of making such products.

BACKGROUND OF THE INVENTION

As a staple food for nearly one-half of the world's population, rice is one of world's most important foodstuffs.

Edible rice is prepared firstly by milling the seeds of the rice plant to remove the chaff. At this point, the product is called brown rice. White rice is then produced by continuing the milling process to remove the husk and the germ. The milling and polishing that converts brown rice to white rice produces a more palatable product, but significantly reduces its nutrient and vitamin content, and removes much of the dietary fibre. Milled white rice typically contains less than about 2 wt. % of dietary fibre on dry weight basis.

Dietary fibre is defined as food material, particularly plant material, that is not hydrolysed by enzymes secreted by the human digestive tract but that may be digested by microflora in gut. Plant compositions that fall within this definition include non-starch polysaccharides (NSP) such as celluloses, gums and pectin as well as lignin, resistant dextrins and resistant starches.

There are four forms of resistant starch—RS 1 (protected starch molecules trapped in the food matrix), RS2 (unswollen granules with highly crystalline regions, e.g. potato starch and green banana starch), RS3 (resistant forms of retrograded amylose or amylopectin), and RS4 (chemically modified starch), all of which may be classed as dietary fibre.

Extensive research has been carried out into the physiological effects of dietary fibre, which is associated with a number of health benefits. High fibre foods, because of their consistency, encourage mastication and stimulate the secretion of digestive juices. The soluble components of dietary fibre cause an increase in the viscosity of the stomach contents, thereby retarding gastric emptying. This then affects the rate of digestion and the uptake of nutrients and creates a feeling of satiety.

Soluble fibre has also been shown to lower selectively serum LDL cholesterol and to improve glucose metabolism and insulin response.

In the colon, dietary fibre tends to increase faecal bulking due to increased water retention and the insoluble dietary fibre reduces transit time. This is particularly important since the conversion of sterols to carcinogenic polycyclic aromatic hydrocarbons is known to occur with time. Epidemiological evidence suggests low faecal weights are associated with an increased risk of cancer of the colon. Dietary fibre may also bind toxins, bile acids and carcinogens. Inverse relationships between fibre intake and the incidence of obesity, heart disease, cancers (of the colon and breast), diabetes and gastrointestinal disorders have been reported. Dietary fibre may also be beneficial in weight reduction.

Brown rice contains a beneficial amount of dietary fibre in the bran layer. However, despite the associated health benefits of brown rice, milled white rice is still generally the more popular product. Certain characteristics of brown rice make it less appealing than white rice, including its darker colour, its longer cooking time, and its propensity to spoil more quickly than white rice due to fat-containing germ-which is removed when making white rice.

As an alternative to brown rice, a number of high-fibre products have been developed by coating processed white rice with dietary fibre.

JP 06-026507 discloses a processed polished rice processing method in which a water solution of one or more kinds of soluble dietary fibre such as guar gum, locust bean gum, tamarind gum and pectin is sprayed onto the surface of rice while it is being polished and then dried. JP 06-026507 discloses a process in which soluble dietary fibre is sprayed onto processed polished rice which is then boiled. During boiling, the soluble dietary fibre "melts" into the water and at the end of the cooking time has entered into the starch tissue of the rice. AU-A-2008335453 describes methods of coating powdered bran onto parboiled milled rice grains.

However, using coating methods to increase the fibre content has certain disadvantages. Rice is often washed with water before cooking, and during cooking is often boiled for up to half an hour. Both the washing and cooking stages can serve to remove or erode the high-fibre coating before it is consumed.

One approach to overcome the problems associated with using coatings is to prepare reconstituted rice kernels.

This approach has been used to incorporate vitamins and other nutrients into rice. FR-A-1530248 discloses fortified artificial kernels prepared from a mixture of semolina or flour and vitamins. The mixture is then formed into strands which are cut into rice-size pieces which are dried. The artificial kernels are mixed with natural grains in a 1:20 up to 1:1000 mixture. However, the artificial kernels often tend to disintegrate during cooking, thereby losing the vitamins to the cooking water and reducing the potential beneficial properties when the cooked rice is consumed.

The process disclosed in U.S. Pat. No. 5,609,896 uses extrusion to prepare artificial enriched rice kernels and overcomes the problems of cooking instability and subsequent vitamin loss by adding specific ingredients such as heat stabilising agents, binding agents and cross-linking agents. However, although the addition of these agents produces a more stable product, production times and costs are increased. Furthermore, such additives have been linked to allergenic reactions and have even been cited as being possible carcinogens.

WO-A-2005053433 describes processes for the preparation of enriched rice-like grains by extrusion of a mixture of rice flour or broken rice with water, one or more micronutrients such as vitamins, and an emulsifier, followed by drying. Similar products and processes are described in WO-A-2010/020640.

KR-A-20060120335 describes processes for the preparation of rice-like grains by extruding a mixture of rice flour and resistant starch, followed by drying. Fabricated rice-like grains are also described in U.S. Pat. No. 4,886,675, EP-A-1166648, EP-A-0277498 and U.S. Pat. No. 5,932,271.

WO2010/102521 describes forming reconstituted cereal grains from a multi-grain raw material that is ground and mixed with water, an emulsifier and further ingredients such as cellulose and nutrients, prior to extrusion.

CN-A-101869241 describes extruded cereal grains based on vanous kinds of flour, including rice flour, pearl barley, red bean or green bean flour. The grains may contain 0-12% of cellulose.

US 2004/109931 describes a reconstituted cereal grain formed from a dough that may contain 1-10% by weight (dry weight) of rice bran.

A need remains for providing an enhanced-fibre granular product which retains its stability and fibre-content whilst being washed and cooked, and also provide a palatable taste and texture when eaten. Preferably, the enhanced-fibre granular product is made via an inexpensive and simple process.

BRIEF DESCRIPTION OF THE INVENTION

In a first aspect, the present invention provides a reconstituted cereal grain, wherein said grain comprises at least about 10 wt. % of resistant starch dietary fibre, at least about 25 wt. % of cereal starch in addition to said dietary fibre, and at least about 0.5 wt. % emulsifier based on the dry weight of the grain; and wherein said grain has a product density of greater than about 1 kg/l.

The term "reconstituted" signifies that the grains are not natural cereal kernels, but have been formed from a mixture or similar mixture of ingredients by a shaping process, in particular by extrusion. The grains may be of any shape. In embodiments they resemble or are substantially identical in appearance with, natural grain kernels, such as milled rice kernels or milled wheat kernels. Suitably, they are shaped to resemble closely milled rice kernels. That is to say, suitably they have a length of from about 5 mm to about 8 mm, a mid-section having a diameter of from about 1.5 mm to about 2.2 mm, said mid-section tapering to rounded or tapered ends of the kernel. In these embodiments the mid-section is substantially cylindrical, or it may be oval in cross section with an aspect ratio (maximum to minimum diameter) of less than about 1.5.

In other embodiments, the grains may have a shape not found in nature, for example any of the fancy shapes such as star shapes, annular shapes or even alphabet shapes as known in the pasta art. Suitably, the cereal grain is a rice-like grain. That is to say, a grain having the dimensions of a parboiled milled rice such as long-grain rice. Suitably, the maximum dimension of each grain is from about 1 mm to about 10 mm, for example from about 2 mm to about 5 mm. Suitably, the grains of the invention are substantially homogeneous, i.e. the composition of the grain is substantially or completely uniform across the grain.

Products of the invention suitably have a product density greater than about 1 kg/liter, for example greater than about 1.1 kg/liter. Product density refers to the Archimedean density, i.e. the average density of the individual grains of the material. Thus, a product density greater than 1 kg/liter signifies that the grains will sink when placed in water. Products of the present invention may have a slightly lower product density than natural white rice due to the presence of the emulsifier.

It has been found that extruded rice grains according to the invention containing 10 wt. % or more of resistant starch dietary fibre can have very similar appearance and texture to natural white rice, but with a much higher dietary fibre content. The term "natural white rice" as used herein is defined white rice deriving from brown rice that has been parboiled and milled, but that has not in any way been reconstituted.

Furthermore, the extruded rice products according to the present invention may be cooked within 10 minutes, and the cooked product closely resembles the taste and texture of cooked parboiled milled rice. Thus, extruded rice products of the present invention provide similar or enhanced benefits relative to brown rice in terms of providing high dietary fibre content, but overcome its associated disadvantages- namely its less appealing darker colour and the inconvenience of its longer cooking time.

Furthermore, grain products of the present invention typically have a lower fat content (1.5-1.7%) than brown rice (about 3%). The higher fat content of brown rice compared with white rice leads to its greater propensity to spoil.

The present inventors have found that a combination of high levels of resistant starch dietary fibre, cereal starch and emulsifier that provides reconstituted grains with an appearance that closely resembles natural white rice kernels. Furthermore, the product can withstand the cooking conditions of natural white rice (boiling in water for 10 minutes) whilst retaining the integrity of its shape and presenting an excellent texture of the cooked product, in particular the resilience or "bite" of the cooked product is identical to that of high quality milled parboiled rice. It has further been found that such grains made with a resistant starch ingredient can have a taste that is indistinguishable from that of natural milled parboiled rice. The use of resistant starch as the dietary fibre ingredient in the reconstituted grains is particularly advantageous because of the neutral colour and taste of the resistant starch and the outstanding texture of the resulting products after cooking.

Without wishing to be bound by theory, it is thought that the claimed combination of rice flour and emulsifier in the granular extruded products of the present invention provides a starch-emulsifier or protein-emulsifier network which helps to stabilise the integrity and shape of the product grains during cooking and enhance the texture and "bite" of the cooked product. The melting point of these complexes are in the range of 105-120° C., and therefore they do not melt under normal cooking conditions. This overcomes the problem that most reconstituted cereal grain compositions (unlike pasta) contain very little protein and therefore tend to disintegrate on cooking in excess water, especially if they contain high levels of dietary fiber.

Suitably, the product comprises from about 15 wt. % to about 35 wt. % of said resistant starch dietary fibre based on the dry weight of the grain, for example from about 20 wt. % to about 30 wt. %, more suitably about 20 wt. % to about 25 wt. % of said resistant starch dietary fibre based on the dry weight of the grain.

The maximum amount of the resistant starch dietary fibre in the products is determined by the feasibility of the handling and processing of the raw ingredients blend containing the dietary fiber, and by the appearance, taste and texture of the final extruded product and the cooked final extruded product.

Suitably, the products of the invention are substantially or completely free of dietary fibre other than resistant starch dietary fibre.

Unless otherwise stated, the dietary fibre contents herein are determined from the total dietary fibre as determined by AOAC method 2009.01 (Codex). This method has replaced the previous AOAC 991.43 measurement, which tended to overestimate the amount of dietary fibre (in particular resistant starch) due to incomplete digestion of non-resistant starches. The present inventors have found that the dietary fibre determined by AOAC 991.43 can be substantially higher than the dietary fibre as determined by AOAC 2009.01 (Codex). The value for the resistant starch dietary fibre corresponds to the value for total dietary fibre in the preferred products that are substantially free of dietary fibre other than resistant starch. In other embodiments, the resistant starch dietary fibre content of the product can be calculated from the resistant starch dietary fibre content of the individual ingredients, since the production process does not alter the resistant starch dietary fibre content to any significant degree.

The cereal starch is non-resistant starch present in addition to the resistant starch forming the dietary fiber component. It is made up of non-resistant starch components of the resistant starch ingredient (as explained further below) and the non-resistant starch of other components, such as from conventional cereal flour ingredients. The cereal starch may be any edible cereal starch, such as rice starch, wheat starch, or potato starch. Most suitably the cereal starch comprises rice starch. Suitably, the grain comprises from about 25 wt. % to about 73 wt. %, for example about 30 wt. % to about 60 wt. % of said cereal starch based on the dry weight of the grain, for example about 35 wt. % to about 50 wt. % of said cereal starch based on the dry weight of the grain. In embodiments, the products of the invention do not contain more than about 10 wt. % of wheat starch, more suitably they do not contain more than about 5 wt. % of wheat starch, i.e. they are not pasta products even though they can be made in a similar way to pasta.

DETAILED DESCRIPTION OF THE INVENTION

In embodiments, the grain comprises at least about 80 wt. % of starches (resistant and non-resistant) based on the dry weight of the grain. Suitably, the cereal grain consists essentially of rice flour, a resistant starch ingredient and emulsifier, together with up to about 15% moisture, preferably no more than about 13 wt. % moisture, for example 10-12 wt. % moisture.

Products of the present invention suitably comprise at least about 0.5 wt. % emulsifier based on the dry weight of the product. Suitably, about 0.5 wt. % to about 2 wt. % of emulsifier is included in the product. Suitably, the product of the present invention comprises from about 0.8 wt. % to about 1.2 wt. % of emulsifier based on the dry weight of the product. As explained above, the emulsifier is present to enhance the integrity and shape of the product grains during cooking, and could also enhance the "bite" of the cooked product.

The term "emulsifier" is used in its normal sense in food science. An emulsifier is a substance that forms or preserves an emulsion by increasing the compatibility of the contact surfaces of two components in a blend. Any food-acceptable emulsifier may be suitable for the present invention. For example, the emulsifier may be selected from the group consisting of phospholipids such as lecithin, enzyme digested lecithin/enzyme- treated lecithin, glycerin fatty acid esters (monoglyceride, MG), acetic acid esters of monoglycerides (acetylated monoglyceride, AMG), lactic acid esters of monoglycerides (lactylated monoglyceride, LMG), citric acid esters of monoglycerides (CMG), succinic acid esters of monoglycerides (SMG), diacetyl tartaric acid esters of monoglycerides (DATEM), polyglycerol esters of fatty acids (polyglycerol ester, PGE), polyglycerol polyricinoleate (PGPR), sorbitan esters of fatty acids (sorbitan ester, SOE), propylene glycol esters of fatty acids (PG ester, PGME), sucrose esters of fatty acids (sugar ester, SE) and calcium stearoyl di lactate (CSL).

Suitably, the products of the invention are substantially free of added protein, that is to say protein other than the protein inherently present in the cereal and dietary fiber ingredients. Suitably there is no more than 2 wt. % of added protein, more suitably no more than 1 wt. % on dry weight basis, and most suitably no added protein. Of course, some protein is normally inherently present in the cereal and dietary fibre ingredients. Accordingly, the grains of the present invention suitably comprise from about 1 wt. % to about 10 wt. % total protein, more suitably from about 2 wt. % to about 8 wt. % protein, for example about 4 wt. % to about 6 wt. % protein on a dry weight basis.

Suitably, the products of the invention are substantially free of added gelling agents, for example glutens, alginates, alginate derivatives, or gums. The present inventors have found that the products do not need such gelling agents to maintain excellent integrity during cooking and a firm texture after cooking. Suitably there is no more than 2 wt. % of added gelling agents, more suitably no more than 1 wt. % on dry weight basis, and most suitably no gelling agents other than those incidentally present in the other ingredients.

Suitably, the products of the invention are substantially or completely free of added dietary fibre components other than said resistant starch. In these embodiments the total dietary fibre content of the products consists of the resistant starch dietary fibre from the resistant starch ingredient, together with incidental amounts of dietary fibre that may be present in the other ingredients.

Preferred products of the invention include grains, suitably rice-like grains, comprising (all percentages except moisture being on dry-weight basis):

35-50 wt. % rice starch, preferably 40-45 wt. % rice starch;
15-35 wt. % resistant starch, preferably 20-30 wt. % resistant starch; 8-15 wt. % moisture;
0.6-1.2 wt. % emulsifier; 1-5 wt. % protein;
less than about 2% lipids; and
at least about 80% total carbohydrate.

It will be appreciated that, in addition to the rice starch and resistant starch identified above, these formulations may comprise non-resistant starch also present in the resistant starch ingredient such as maize flour. Thus, the total starch content and total carbohydrate content may be more than the sum of rice starch and resistant starch contents.

In a second aspect, the present invention provides a cereal product comprising, consisting essentially of, or consisting of a plurality of reconstituted cereal grains according to the invention. For example, the product may consist of the grains according to the invention. Alternatively, the reconstituted grains of the invention may be admixed with natural grains such as milled parboiled cereal grains. Since the grains of the invention are not puffed or expanded to any significant degree, such products typically have a bulk density from about 600 g/l to about 900 g/l, preferably from about 750 g/l to about 850 g/l. Bulk density (also known as tap density) is the density of the whole granular material including the interstitial air between the grains.

The above product densities and bulk densities of the products are typical of dried parboiled milled cereal products that have not been puffed or expanded. The grains and products of the present invention are not puffed or expanded to any significant degree. Indeed, the process conditions are selected as described below to minimize puffing or expansion of the grains.

For example, the rice-like grains according to the present invention can be mixed with milled parboiled rice in a proportion by weight of from about 1% to about 99%, for example from about 10% to about 80%, such as from about 30% to about 70%. This is possible because the products of the invention have cooking properties and texture that are virtually indistinguishable from those of the conventional cereal grains, so that the two types of grain can be cooked together to produce a homogeneous product having higher levels of dietary fibre. It may be more economical to achieve a desired level of fibre content by mixing high-fibre grains according to the invention with conventional grains than by making a product entirely from grains according to the invention having the desired level of fibre.

Therefore, for economic reasons as well as technical reasons, it is desirable for the grains according to the invention to have the highest level of dietary fibre that is compatible with the manufacturing method and desired cooking properties and texture of the products. Accordingly, the grains of the invention suitably contain at least about 20 wt % of dietary fiber on a dry weight basis, for example at least about 25 wt. % of dietary fiber on a dry weight basis. Suitably, said total dietary fibre consists essentially of resistant starch dietary fibre. It has surprisingly been found that excellent cooking properties and bite can be achieved even at such high dietary fiber levels.

As noted above, the grains of the invention suitably have cooking properties substantially identical to natural milled parboiled kernels. Suitably, 100 g of the product of the present invention has a water uptake of from about 90 g to about 150 g on cooking in excess water at 100° C. for 10 minutes, preferably from about 90 g to about 140 g.

The products of the present invention are suitably made by extruding a mixture comprising a the resistant starch ingredient, a cereal flour, emulsifier and water through a suitable die plate, with a cutter to cut the extruded strands into grains. More complex extrusion methods could be used to make grains of different shapes. Heating and partial gelatinization of the starch in the mixture is performed in the extruder, or in a preconditioner. The extrusion process may be a "cooking extrusion", sometimes referred to as "hot extrusion" method, or preferably it may be a "pasta extrusion", sometimes referred to as "cold extrusion" process similar to pasta manufacture.

The strands exiting the extruder are cut into grains, for example pieces the size of rice grains, by a rotating knife or similar. It will be appreciated that grains in the form of any of the fancy shapes known in pasta manufacture can be prepared by extrusion. The so obtained grains are dried in a suitable dryer, such as a fluidized bed dryer or a belt dryer, to a moisture content of no more than about 15 wt. %, suitably 10-13 wt. %.

In the context of this invention, a "resistant starch ingredient" is defined as a product that contains resistant starch, but need not be entirely composed of resistant starch. For example, the commercially available "resistant starches" are ingredients containing 10 to 60 wt % of resistant starch (AOAC 991.43 method). The balance of these ingredients consists essentially of non-resistant starches. These ingredients are generally made from high amylose containing grain varieties, such as maize varieties, optionally with additional processing. High resistant starch maize flour is especially suitable. For example, HI-MAIZE 260 (National Starch Co.) is a commercially available maize flour ingredient which contains a minimum of 60% resistant starch fibre (AOAC 991.43 dry basis).

Suitably, the cereal flour ingredient contains, consists essentially of, or consists of rice flour. Rice starch is the major component of natural white rice and usually forms 90-93% of the dry weight of the rice. Thus, rice starch is also a major component of rice flour. For example, commercially available rice flour Remyflo R7-250 contains a minimum of 85% rice starch (total weight basis). Rice flour inherently contains very little or no resistant starch.

In embodiments, the mixture consists essentially of, or consists of, the resistant starch ingredient, cereal flour, water and emulsifier.

In preferred embodiments of the invention, the mixture comprises, consists essentially of, or consists of the following components, based on the weight of the ingredients excluding added water:

25-60 wt. %, suitably 30-50 wt. % cereal flour, preferably rice flour 35-70 wt. %, suitably 50-65 wt. % of a resistant starch ingredient, preferably a maize-derived resistant starch flour; and 0.6-1.2 wt. % emulsifier.

Suitably, the above components make up at least about 90%, more suitably at least about 99 wt %, and most suitably substantially all of the ingredients other than water.

Any features or embodiments described herein in relation to any one aspect or embodiment of the invention may be used in relation to any other aspect or embodiment.

In particular, any of the ingredients or methods described in relation to the methods of manufacture may be used to make the products according to the invention.

EXAMPLES

In these examples, rice-like granular extruded products were made by a pasta extrusion method according to the following formulations. The formulations contained rice flour (Remyflo R7-250) and emulsifier. Formulation 1 contained no added dietary fibre (reference example). Formulation 2 contained a resistant starch. The resistant starch ingredient is HI-MAIZE 260 (National Starch Co.) obtained from maize and having a nominal 60 wt % dietary fiber content (AOAC 991.43).

TABLE 1

|  | Formulation | |
| --- | --- | --- |
| Raw materials | 1 | 2 |
| Rice flour/kg | 150 | 7 |
| Poly C One/kg (emulsifier) | 1.2 | 1.2 |
| Maize starch/kg | 0 | 7 |

The formulations were mixed in lab batch mixtures. The granular extruded products were then produced using a lab-scale Polymatik extruder TPXL 1. The handling and processing of the formulations within the extruder was assessed. For each formulation, the amount of steam added to the dry formulations was varied in order to produce products with different texture characteristics. The granular extruded products were then dried.

The dried reconstituted grain product samples were cooked for 10 minutes (100 g of dried reconstituted grain product per 1 liter of water). Once cooked, the characteristics of the reconstituted grain product, such as surface stickiness and texture/bite were evaluated.

The parameters of uncooked appearance, texture, bite, cooked taste, surface stickiness (cooked) and shape stability of the cooked trial samples were all compared with an "ideal standard", which was a sample of cooked commercially available parboiled milled rice (Uncle Ben's® long grain rice with a recommended cooking time of 10 minutes). The ideal standard rice has a water uptake of from 100 to 150 g of water per 100 g of dry rice on cooking in excess water at 100° C. for 10 minutes.

The results of these tests can be summarized as follows.

Formulation 1 (no resistant starch product): processing was unproblematic. The resulting rice-like kernels had a good appearance, taste, texture and stability on cooking.

Formulation 2 (maize resistant starch): Processing was unproblematic, subject to some adjustment of the particle sizes of the ingredients. The grains made with maize resistant starch were visually indistinguishable from the ideal standard both before and after cooking, and had excellent consistency, taste and bite after cooking. The product has a water uptake of from 90 to 150 g of water per 100 g of dry product on cooking in excess water at 100° C. for 10 minutes, preferably from about 90 to 140 g of water. This water uptake is therefore well matched with the water uptake of the ideal standard rice, and the product is therefore especially suitable for blending with the ideal standard rice to achieve a range of products each having a desired overall fibre content.

In addition, a texture measurement was prepared on the rice cooked as described above for 10 minutes in excess boiling water. For this measurement, the cooked rice was cooled in air, then 17 g samples were packaged in plastic bags and stored in a refrigerator for 24 hours. Each sample was then loaded into a test cell.

The test cell was in the form of a rectangular enclosure having a cross-section of 5.8 cm². The top of the enclosure was open to admit a piston of an Instron stress tester. The bottom of the enclosure was closed by a perforated plate having 39 uniformly spaced circular holes of diameter 3 mm for extruding the rice.

The test cell was mounted in an Instron load measurement device equipped with a rectangular piston of area 5.8 cm² for fitting closely into the rectangular cell to press the rice through the holes in the bottom of the cell. The piston was pressed down at 100 mm/minute, programmed to descend 105 mm, and the maximum load on the piston was determined. A high maximum load was therefore indicative of a relatively firm cooked rice product. A low maximum load was indicative of a rice product that is soft or easily disintegrated. Each measurement was repeated at least 10 times. The results were as follows:

Ideal Standard Rice (reference example): The maximum load ranged from 161 to 356 kN for 12 samples, mean value 308 kN.

Maize Resistant Starch (inventive example): The maximum load ranged from 152 to 253 kN for 11 samples, mean value 211 kN. This indicates that the texture of the inventive product is not much softer than that of the Ideal Standard rice.

A further comparative example was performed on an extruded rice made in the same way as the maize resistant starch product but with replacement of the resistant maize starch component by an equal weight of a commercially available pea fiber (20-100 micrometer pea fiber from DPS/Dutch protein services having a maximum of 66% dietary fiber by AOAC 991.43 dry basis). This pea fiber is a cellulose/hemicellulose dietary fiber, in contrast to the resistant starch dietary fiber of the present invention. The pea fiber products measured in the same way exhibited a maximum load of from 100 to 149 kN for 14 samples, mean 135 kN, indicating that these samples are significantly softer than the ideal standard rice.

These results were independently confirmed by a trained panel which scored the products on a scale from 1 to 10 for hardness/softness. A high score indicates hard kernels, a low score indicates soft kernels. The score of ideal standard rice (Uncle Ben's 10 min Long Grain) was set at 6 and the score of Uncle Ben's 20 min Long Grain (softer rice) was set at 2. The Maize Resistant Starch example was subsequently scored a 4.7, and the Pea fiber example scored a 1.2 (softer than the Uncle Ben's 20 min Long Grain).

Accordingly, it can be seen that the extruded products made in accordance with the invention suitably have a maximum extrusion as determined by the method above after cooking in excess water for 10 minutes at about 100° C. of at least about 150 kN, more suitably at least about 200 kN.

Overall, the products comprising dietary fibre in the form of resistant starch provided reconstituted grain products which very closely resembled the commercially available rice, in terms of appearance, taste and texture.

The above examples have been described for the purpose of illustration only. Many other examples falling within the scope of the accompanying claims will be apparent to the skilled reader.

What is claimed is:

1. A reconstituted cereal grain, said grain comprising:
   at least about 10 wt. % of resistant starch dietary fibre;
   at least about 25 wt. % of cereal starch in addition to said resistant starch dietary fibre;
   at least about 0.5 wt. % emulsifier based on the dry weight of the grain; and
   wherein said grain has a product density of greater than about 1 kg/l.

2. The reconstituted cereal grain according to claim 1, wherein said product comprises from about 15 wt. % to about 35 wt. % of said resistant starch dietary fibre based on the dry weight of the grain.

3. The reconstituted cereal grain according to claim 2, wherein said product comprises from about 20 wt. % to about 30 wt. % of said resistant starch dietary fibre based on the dry weight of the grain.

4. The reconstituted cereal grain according to claim 1, wherein said product comprises from about 35 wt. % to about 95 wt. % of said cereal starch based on the dry weight of the grain.

5. The reconstituted cereal grain according to claim 4, wherein said product comprises from about 45 wt. % to about 85 wt. % of said cereal starch based on the dry weight of the grain.

6. The reconstituted cereal grain according to claim 1, wherein said grain comprises at least about 80 wt. % of starches based on the dry weight of the grain.

7. The reconstituted cereal grain according to claim 1, wherein said cereal starch is rice starch.

8. The reconstituted cereal grain according to claim 1, wherein said cereal grain is a rice-like grain.

9. The reconstituted cereal grain according to claim 1 comprising:
   35-50 wt. % rice starch;
   15-35 wt. % resistant starch dietary fibre;
   8-15 wt. % moisture;
   0.6-1.2 wt. % emulsifier;
   1-5 wt. % protein;
   less than about 2% lipids; and
   at least about 80% total carbohydrate.

10. A cereal product comprising:
    reconstituted cereal grains comprising:
       at least about 10 wt % of resistant starch dietary fibre;
       at least about 25 wt % of cereal starch in addition to said resistant starch dietary fibre;
       at least about 0.5 wt % emulsifier based on the dry weight of the grain; and
       wherein said grains have a product density of greater than about 1 kg/l.

11. The cereal product according to claim 10, further comprising milled parboiled cereal grains.

12. The cereal product according to claim 10, wherein said product has a bulk density from about 600 g/l to about 900 g/l,.

13. The cereal product according to claim 10, wherein 100 g of the product has a water uptake of from about 90 g to about 140 g on cooking in excess water at 100° C. for 10 minutes.

14. The reconstituted cereal grain according to claim 9, wherein the rice starch is 40-45 wt. %.

15. The reconstituted cereal grain according to claim 9, wherein the resistant starch is 20-30 wt. %.

16. The cereal product according to claim 10, wherein said product has a bulk density from about 750 g/l to about 850 g/l.

* * * * *